United States Patent [19]

McAllister

[11] Patent Number: 4,519,357
[45] Date of Patent: May 28, 1985

[54] AIR IONIZER FOR INTERNAL COMBUSTION ENGINES

[75] Inventor: Don M. McAllister, Wethersfield, Conn.

[73] Assignee: Am-Air Limited Partnership, Md.

[21] Appl. No.: 428,471

[22] Filed: Sep. 29, 1982

[51] Int. Cl.³ .............................................. F02M 27/00
[52] U.S. Cl. ..................................... 123/539; 123/537
[58] Field of Search ................ 123/536, 537, 538, 539

[56] References Cited

U.S. PATENT DOCUMENTS

| | | | |
|---|---|---|---|
| 1,376,180 | 4/1921 | Wickersham | 123/538 |
| 1,680,537 | 8/1928 | Grooms | 123/536 |
| 1,771,626 | 7/1930 | Hamilton | 123/537 |
| 1,873,746 | 8/1932 | English | 123/539 |
| 2,146,265 | 2/1939 | Moore | 123/539 |
| 2,169,844 | 8/1939 | Marshall | 123/537 |
| 2,960,975 | 11/1960 | Bergstrom | 123/539 |

FOREIGN PATENT DOCUMENTS

| | | | |
|---|---|---|---|
| 2435481 | 2/1976 | Fed. Rep. of Germany | 123/536 |
| 506136 | 8/1920 | France | 123/536 |
| 734529 | 10/1932 | France | 123/539 |
| 1119522 | 2/1955 | France | 123/536 |

OTHER PUBLICATIONS

European Pat. Off. #0043477, 6-20-81-Schupfner—PCT.

Primary Examiner—Ronald H. Lazarus
Attorney, Agent, or Firm—Arthur L. Lessler

[57] ABSTRACT

An air ionizer for installation in the air intake path of an internal combustion engine, to introduce ozone and other oxidizing agents into the engine with acceptable levels of air flow restriction and at a sufficient concentration level to substantially improve combustion within the engine. A glass tube is filled with an inert gas and has an inner electrode extending a short distance into an end of the tube. A foraminous copper outer electrode substantially surrounds the glass tube and is slightly spaced apart from it. A high voltage is applied between the inner and outer electrodes, so that when air flows past the tube, ozone and other oxidizing agents are generated between the outer surface of the tube and the outer electrode, and escape into the air stream through the holes in the outer electrode.

18 Claims, 11 Drawing Figures

AIR IONIZER FOR INTERNAL COMBUSTION ENGINES

BACKGROUND OF THE INVENTION

This invention relates to an air ionizer, and more particularly to apparatus for introducing oxidizing agents into an air stream; and is particularly suitable for, but not limited to, apparatus for improving the efficiency of internal combustion engines.

It is known in the art that the efficiency of an internal combustion engine (or any other machine or device utilizing air for combustion) can be improved by introducing ozone into the intake air stream being delivered to the engine. Such ozone injection systems are described, for example, in the following references:

European Pat. No. 43,477
French Pat. No. 734,529
French Pat. No. 2,476,221
U.S. Pat. No. 1,959,738
U.S. Pat. No. 2,146,265
U.S. Pat. No. 2,960,975
U.S. Pat. No. 3,476,095
U.S. Pat. No. 4,195,606
U.S. Pat. No. 4,308,844

As described in these references, in an ozone injection system for internal combustion engines, the ozone is usually made by subjecting engine intake air to intense ultraviolet radiation or by passing the air through a tube between coaxial metallic electrodes, with a high voltage applied to produce an electric discharge between the electrodes. However, such arrangements are not capable of producing ozone at a sufficiently high rate with an acceptably low level of restriction of the air flow, and have therefore not been successfully employed in the intake air paths of internal combustion engines in general and automotive or marine engines in particular.

Accordingly, an object of the present invention is to provide an improved air ionizer suitable for use in increasing the efficiency of an internal combustion engine.

SUMMARY OF THE INVENTION

As herein described, there is provided an air ionizer, comprising: a hollow member having a wall with an inner and outer surface; electrode means disposed within said member in contact with said inner surface of said wall; a foraminous outer electrode spaced from and substantially surrounding the outer surface of said wall; and means for applying a high voltage between said electrode means and said outer electrode to generate ozone in air or oxygen-containing gas introduced into the space adjacent said outer surface of said wall.

IN THE DRAWING

DETAILED DESCRIPTION

Figure 1:
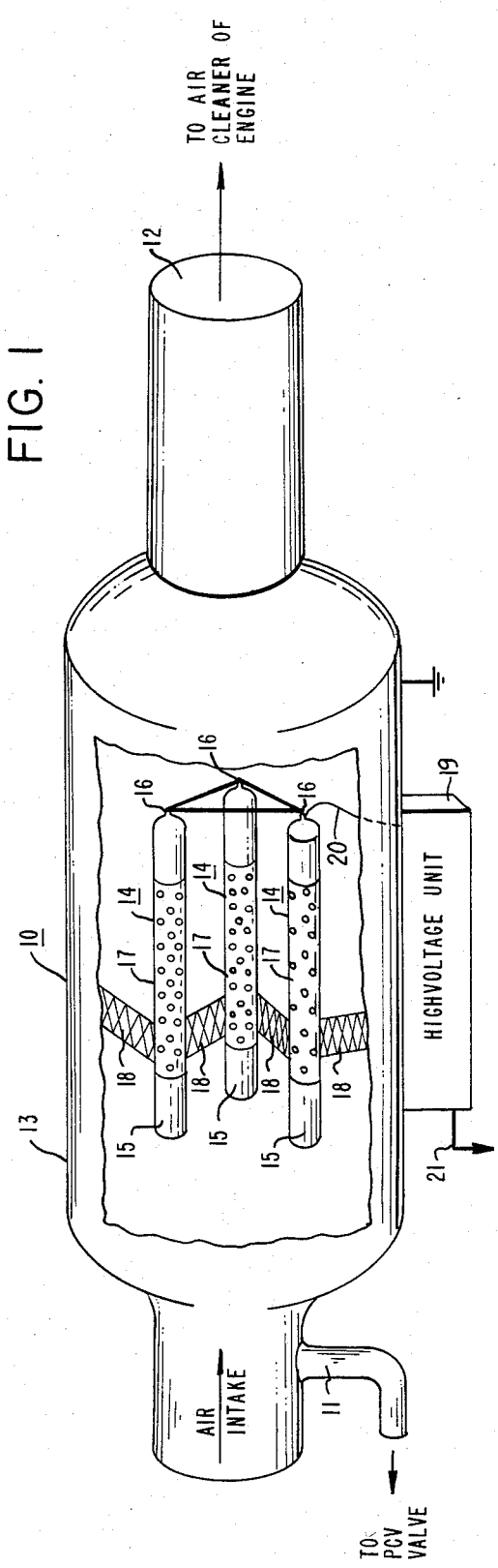
FIG. 1 is a partially cutaway perspective view showing an air ionizer arrangement (consisting of three air ionizer units) for use in improving the efficiency of an internal combustion engine, according to a preferred embodiment of the present invention.

As seen in FIG. 1, an air ionizer arrangement 10 is disposed in the air conduit path leading to the air cleaner of an internal combustion engine. A small amount of air is bled off by the line 11, upstream of the air ionizer arrangement 10, and leads to the engine's positive crankcase ventilation (PCV) valve.

The air processed by the air ionizer arrangement 10 emerges from the outlet conduit 12 and is fed to the air cleaner of the engine. This processed air contains ozone and other oxidizing agents, which substantially improves the efficiency of combustion of fuel within the engine. In tests with both gasoline and diesel engines, substantial efficiency (mileage) improvements have been noted, as well as visibly cleaner exhaust.

The air ionizer arrangement 10 has an outer metallic shell 13, and three elongated air ionizer units 14 having their longitudinal axes aligned with the direction of air flow. Each of the units 14 has a dielectric insulating glass tube 15, an inner electrode lead 16, a foraminous outer electrode 17 substantially surrounding the glass tube 15, and an outer electrode copper strap 18 connected to the grounded shell 13.

The strap 18 is soldered to each of the outer electrodes 17. In the arrangement which was actually constructed, this was done in such a manner that a significant (about 10%) portion of the surface area of the electrode 17 was coated with a layer of solder, i.e. lead-tin alloy. It is not known what effect, if any, this solder layer had upon the performance of the air ionizer arrangement 10.

A high voltage unit 19 is secured to the outer surface of the shell 13 and has one output line (not shown) grounded via the shell 13, and the other output line 20 extending through (and insulated from) the shell 13 to connect to the inner electrode leads 16 of each of the air ionizer units 14. Power for the high voltage unit 19 is supplied from an engine battery via line 21. The high voltage unit 19 contains an inverter and high voltage transformer to convert the low voltage DC supplied by the battery to a high voltage, preferably in the range of 500 to 15,000 volts. Either AC or DC high voltage may be provided, with AC high voltage (500 to 15,000 volts RMS) being preferred for reasons of safety. In the arrangement actually constructed, an AC voltage of 5,000 volts RMS was employed. The frequency of the AC voltage is not critical, and while frequencies in the range of 50 to 5,000 Hz. are preferred, other frequencies may be used.

Figure 2:
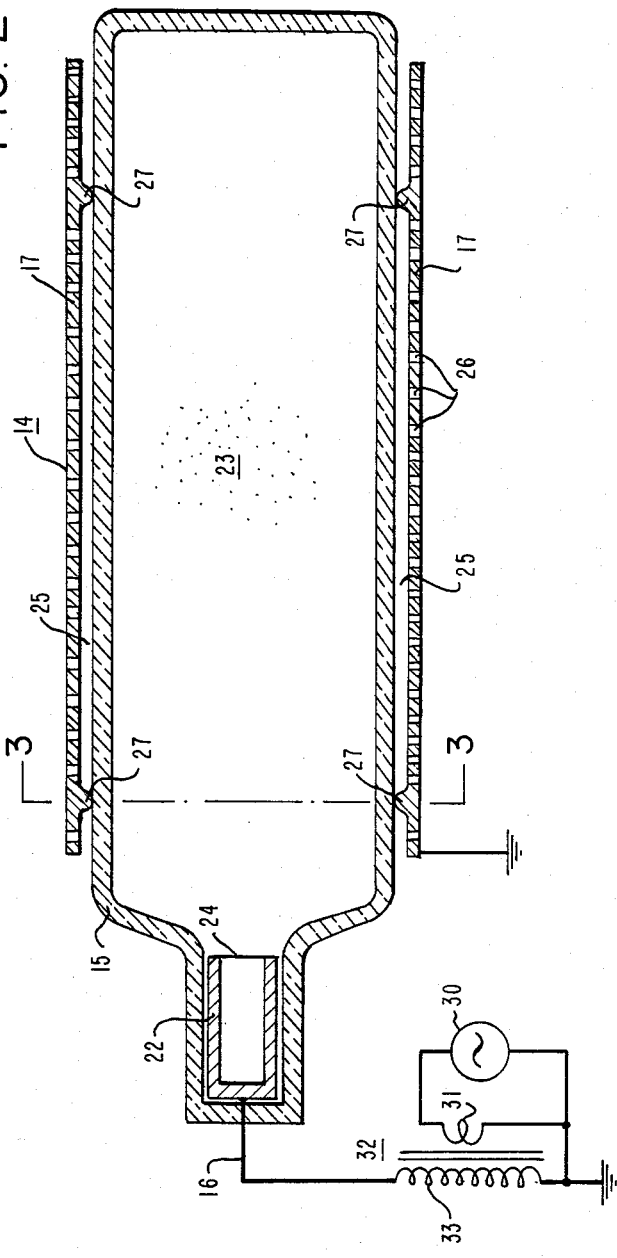
FIG. 2 is a longitudinal cross-sectional view of one of the air ionizer units shown in FIG. 1.

As best seen in FIG. 2, each air ionizer unit 14 has a hollow cylindrical inner electrode 22 connected to the inner electrode lead 16 and extending into one end of the glass tube 15. The inner electrode 22 may comprise any metal resistant to deterioration by ion bombardment, such as copper, gold, nickel or tungsten.

Figure 3:
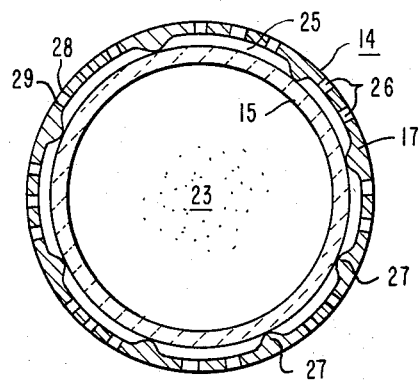
FIG. 3 is a transverse cross-sectional view of the air ionizer unit shown in FIG. 2, taken along the cutting plane 3—3 thereof.

As best seen in FIGS. 2 and 3, the interior of the glass tube 15 is filled with an ionizable gas 23, which is in contact with the inner wall of the tube as well as the annular end 24 of the inner electrode 22. The gas 23 may comprise an inert gas (helium, neon, argon, xenon, krypton, radon) or mercury vapor. The use of argon gas is preferred.

When high voltage is applied between the inner electrode 22 and the outer electrode 17, the gas 23 is ionized, and acts as a "gaseous electrode" in contact with the inner wall of the tube 15, to cooperate with the outer electrode 17 through the glass dielectric wall of the tube 15, so as to produce a strong electric field in the space 25 between the outer wall of the tube 15 and the inner surface of the outer electrode 17. Cf. U.S. Pat. No. 3,696,269. This strong electric field acts on air in the space 25 to produce ozone and other oxidizing agents which exit through the holes in the outer electrode 17 to merge with the airstream and thus move through the conduit 12 (FIG. 1) to enter the engine, where they enhance the combustion process.

Preferably, the gas 23 should be maintained at a pressure on the order of 1 to 10 mm. of mercury; and the thickness of the wall of the tube 15 should be in the range of 0.04 to 0.08 inch. The space 25 should have a width in the range of 0.003 to 0.030 inch.

The outer electrode 17 is preferably made of copper, and is provided with a multiplicity of holes 26 which produce local electric field concentrations and which facilitate merging of ozone and other oxidizing agents generated in the space 25, with the airstream. The total area of the holes 26 should preferably be at least 35% of the gross area of the outer electrode 17.

The gross area of the outer electrodes 17 should preferably be at least 0.126 square inch for each horsepower generated by the engine to which the air ionizer arrangement 10 (FIG. 1) is connected. The thickness of each electrode 17 should be in the range of 0.025 to 0.08 inch.

Figure 4:
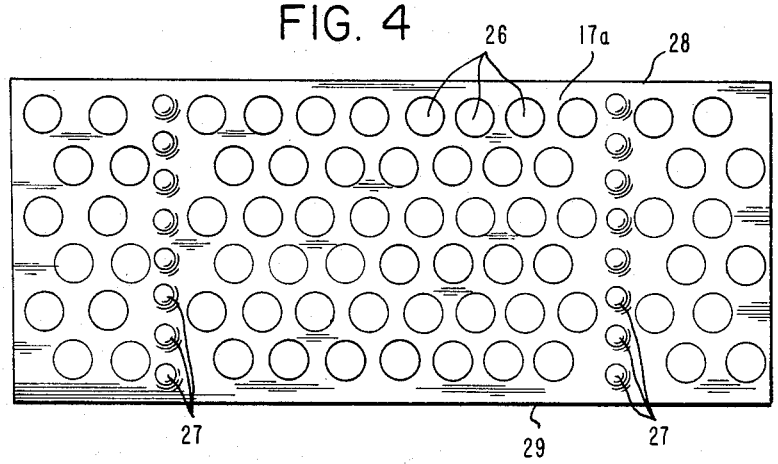
FIG. 4 is a plan view of a sheet used in making the outer electrode of the air ionizer unit shown in FIG. 2.

As seen in FIGS. 2 to 4, the outer electrode 17 is spaced from the outer wall of the tube 15 by two or more annular rows of dimples 27 formed in the surface of the outer electrode 17. As best seen in FIG. 4, the outer electrode 17 is made from a foraminous sheet 17a, which is formed with the dimples 27, and is then rolled into the form of a cylinder (slightly smaller in inner diameter than the outer diameter of the tube 15), with the edges 28 and 29 adjacent each other; after which the cylinder is slid over the tube 15, with the cylinder being held in place by the resilience of the material thereof.

As seen in FIG. 2, an AC power source 30 (which may be an oscillator connected to a battery) is connected to the primary winding 31 of a high voltage transformer 32. One end of the secondary winding 33 of the transformer 32 is connected to the inner electrode 22, while the other end thereof is grounded, as is the outer electrode 17. The resulting electric field generates ozone and other oxidizing agents in the space 25 between the outer surface of the glass tube 15 and the inner surface of the outer electrode 17, thus subjecting the adjacent copper surface of the electrode 17 to a strong oxidizing atmosphere.

This strong oxidizing atmosphere causes copper sulphide to "grow" on the inner surface of the outer electrode 17, forming an irregular surface thereon and reducing the width of the space 25. These effects are believed to result in intensification of the electric field in the space 25, enhancing the generation of ozone and other oxidizing agents therein. For these reasons the performance of the air ionizer unit 14 has been found to improve during the first few days of use, thereafter stabilizing at the improved level—at which time the outer electrode 17 has acquired a blue-green (copper sulphide) appearance.

Air ionizer arrangements of the general type shown in FIGS. 1 to 3 were tested in an automobile gasoline engine and in a pair of marine diesel engines. In both cases substantial improvements in mileage were noted over an extended period of time.

The prior art teaches that an ozone generator also forms oxides of nitrogen, particularly in high humidity conditions; and suggests that the ozone generator be fed pure oxygen and/or be fed with moisture-free air. See *General Chemistry*, Rochow & Wilson, c. 1954 by J. Wiley & Sons, Inc., pp. 138–141; particularly at page 139, where it is stated "Pure oxygen must be fed into the electric-discharge ozonizer, since if air is used some of the nitrogen is oxidized to nitrogen oxides which have chemical reactions similar to those of ozone." The ozone-generating apparatus shown at page 139 of this reference includes a trap for removing moisture. As to problems of prior art ozone generators under high humidity conditions, see U.S. Pat. No. 4,195,606, Col. 1, lines 25–28 which indicate that in prior art generators "the electrostatic fields break down in damp or humid weather." For this reason some prior art ozone injection systems employ air dryers in the intake airstream, resulting in additional expense and restriction of the air flow. See, e.g. the air dryer 46 which appears in FIG. 1 of U.S. Pat. No. 4,308,844.

In the arrangement of the present invention it has been found, however, that excellent results are achieved under high humidity conditions, such as those encountered in rain and in marine engines. Accordingly, no air dryer is needed in conjunction with the air ionizer arrangement of the present invention.

Further, tests were conducted on the aforementioned automobile gasoline and marine diesel engines to determine the effect of the air ionizer arrangement of the present invention on engine emission levels. These tests surprisingly indicated that not only were the levels of oxides of nitrogen in the engine exhaust not made worse by the air ionizer arrangement described above—they were actually reduced! The tests were conducted at a time when the atmospheric relative humidity was about 90%. At the present time the reason for this result is not known, but it is suspected that some sort of chemical interaction with the outer electrodes 17 is involved.

Due to voltage drop in the "gaseous electrode" 23, the electric field strength in the interaction space 25 decreases with increasing distance from the inner electrode 22, so that the region of said space remote from the inner electrode 22 produces much less ozone than the region near said inner electrode.

Figure 5:
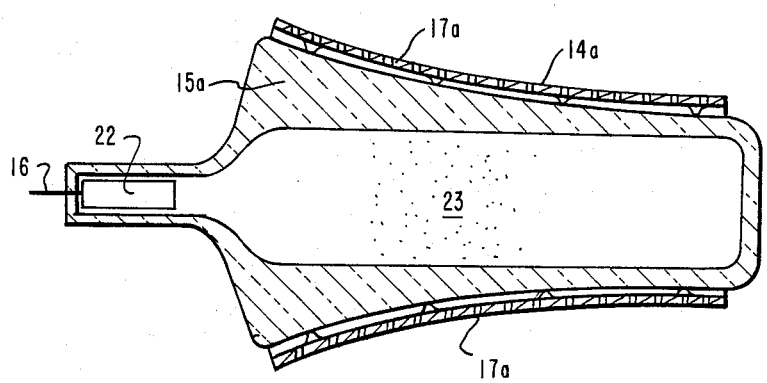
FIG. 5 is a longitudinal cross-sectional view of an air ionizer unit according to a first alternative embodiment of the invention.

In order to compensate for this voltage drop effect and to equalize the electric field along the length of the outer electrode 17, the wall of the tube 15 may be made relatively thick in the region near the inner electrode 22 and relatively thin in the region remote therefrom, as shown in FIG. 5, where such a variable thickness tube 15a is provided, with a conforming outer electrode 17a. In all other respects the air ionizer unit 14a shown in FIG. 5 is identical to that shown in FIGS. 2 to 4.

Preferably, the thickness of the wall of the tube 15a should vary according to a hyperbolic function, although a linear variation of wall thickness will also produce good results.

Figure 6:
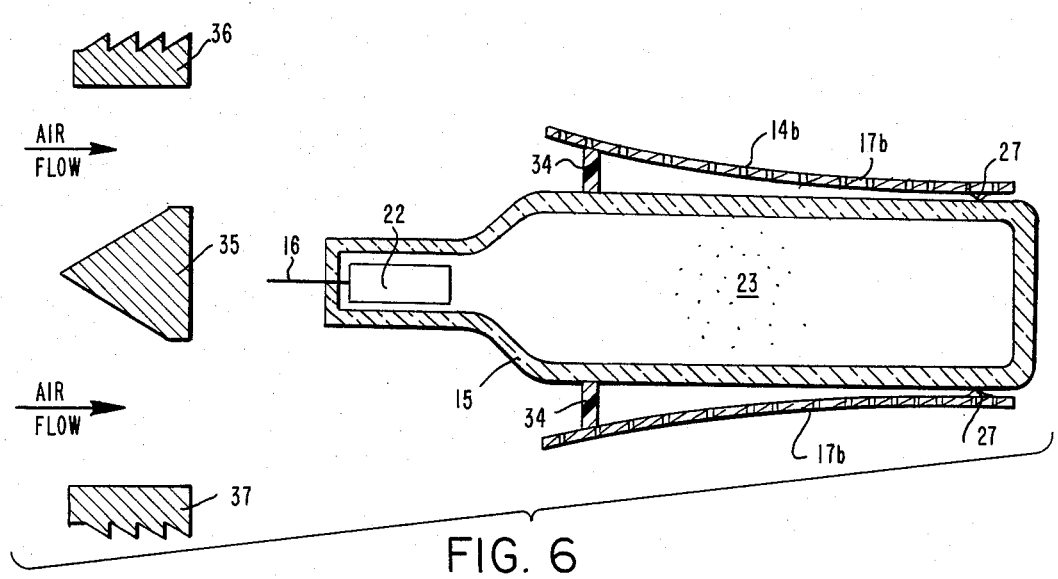
FIG. 6 is a longitudinal cross-sectional view of an air ionizer unit according to a second alternative embodiment of the invention.

Another way to compensate for the aforementioned voltage drop effect is to vary the spacing between the outer electrode and the outer surface of the glass tube, so that the width of the space therebetween is relatively great in the region near the inner electrode 22 and relatively small in the region remote from said inner electrode. Such a structure is shown in FIG. 6, wherein the distance between the outer surface of the tube 15 and the outer electrode 17b varies according to a hyperbolic or linear function. A spacer ring 34 of insulating material establishes the distance between the outer electrode 17b and tube 15 at the end near the inner electrode 22; while the dimples 27 establish said space at the end remote from said inner electrode. A baffle structure consisting of a conical center baffle 35 and a coaxial apertured plate 36 guides intake air in a cylindrical path aligned with the outer electrode 17b, to provide greater interaction between the airstream and the air ionizer unit 14b. In all other respects the air ionizer unit 14b shown in FIG. 6 is identical to that shown in FIGS. 2 to 4.

Figure 7A:
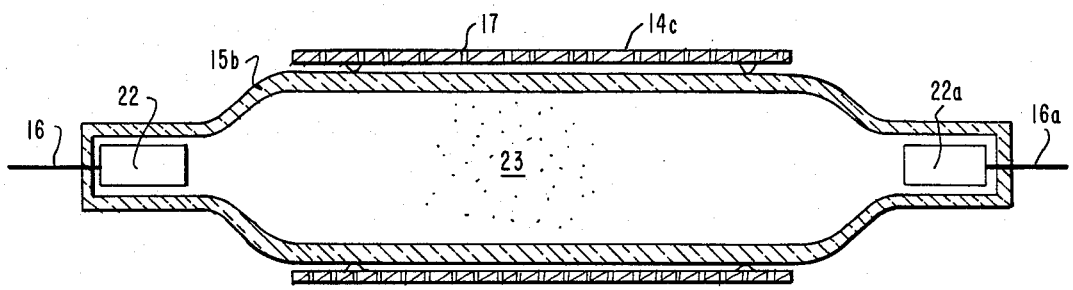
FIG. 7a is a longitudinal cross-sectional view of an air ionizer unit according to a third alternative embodiment of the invention.

Another way of improving the performance of the air ionizer unit 14 is to provide an additional inner electrode 22a at the other end of the tube, as shown in FIG. 7a. With this arrangement the electric field between the outer electrode 17 and the tube 15b is greatest at the ends of the tube and least in the center of the tube. In all other respects the air ionizer unit 14c shown in FIG. 7a is identical to that shown in FIGS. 2 to 4.

Figure 7B:
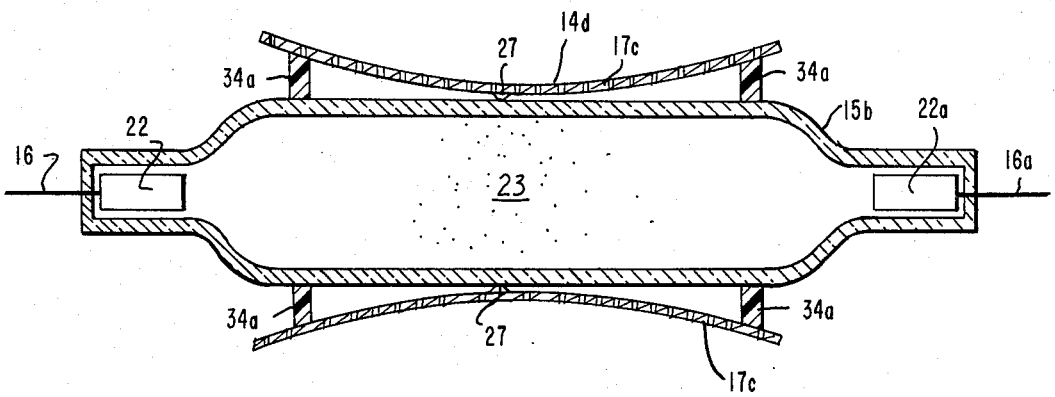
FIG. 7b is a modification thereof.

Additional improvement in field uniformity can be realized by modifying the structure of FIG. 7a to vary the spacing between the outer electrode and the tube 15b so that the spacing is greater at the ends of the tube and least at a point equidistant from said ends, as shown in FIG. 7b. The cross-section of the outer electrode 17c should preferably then have a hyperbolic contour, although a V-shaped contour may also be employed with good results. The outer ends of the electrode 17c are spaced from the tube 15b by spacer rings 34a, while the center of the electrode 17c is spaced form the tube 15b by dimples 27. In all other respects the air ionizer unit 14d shown in FIG. 7b is identical to that shown in FIG. 7c.

Figure 8:
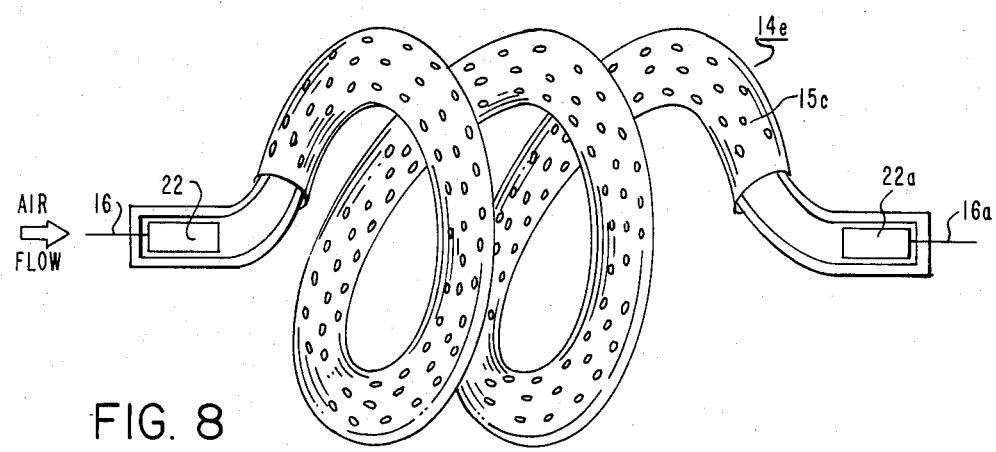
FIG. 8 is a longitudinal cross-sectional view of an air ionizer unit according to a fourth alternative embodiment of the invention.

The tube 15b shown in FIG. 7a may be formed into a helical shape instead of being straight, in order to provide greater interaction with the airstream, as shown in FIG. 8. In all other respects the air ionizer unit 14e shown in FIG. 8 is identical to that shown in FIG. 7a.

Figure 9:
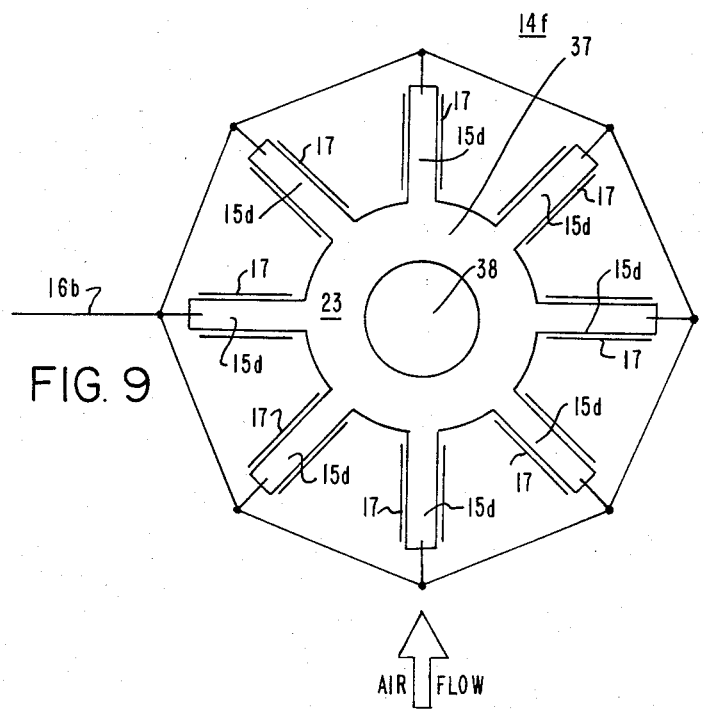
FIG. 9 is a longitudinal cross-sectional view of an air ionizer unit according to a fifth alternative embodiment of the invention.

A more complex structure, in which tube portions 15d extend radially outward from a central portion 37, is shown in FIG. 9. The central portion 37 is generally disc-shaped and hollow, with its interior communicating with all of the tube portions 15d, the internal space of the central portion 37 and the tube portions 15d being filled with the ionizable gas 23. Each of the tube portions 15d is substantially surrounded by an outer electrode 17 which has dimples for spacing the same form the corresponding tube. Supplemental outer electrodes 38 are disposed adjacent and spaced from the top and bottom planar surfaces of the central portion 37, with the supplemental electrodes 38 being electrically connected to the outer electrodes 17. In all other respects the air ionizer unit 14f shown in FIG. 9 is identical to that shown in FIGS. 2 to 4, with ozone and other oxidizing agents being generated in the spaces between the tubes 15d and the outer electrodes 17 as well as in the spaces between the central portion 37 and supplemental outer electrodes 38.

Figure 10:
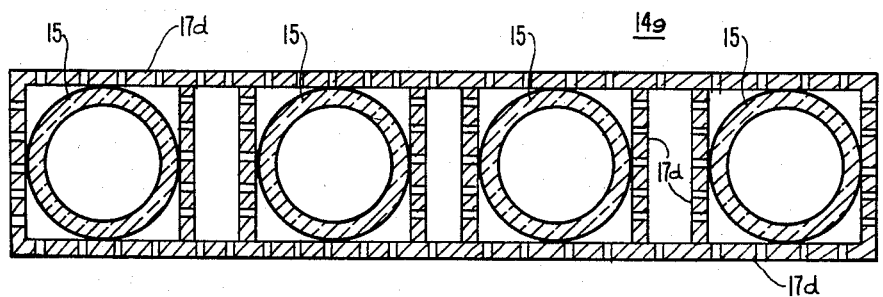
FIG. 10 is a transverse cross-sectional view of an air ionizer assembly according to a sixth alternative embodiment of the invention.

Instead of utilizing a circular cylindrical outer electrode 17, it has been found that good results can also be achieved with a square cylindrical foraminous outer electrode structure. Such an arrangement, which lends itself to a linear electrode array, is shown in FIG. 10, in which the linear array 14g comprises four parallel air ionizer units, each of which has a central glass tube 15 with the same internal structure as the tube 15 shown in FIG. 2. Each of the glass tubes 15 shown in FIG. 10 is surrounded and tangentially contacted by adjacent walls of a perforated copper sheet outer electrode 17d which consists of parallel upper and lower flat sheets and a series of vertical partition walls extending between said flat sheets. The electrode structure 17d thus serves not only as an ozone-generating electrode but also as a "package" for supporting the tubes 15. Since there is only line contact between the tubes 15 and the adjacent walls of the outer electrode 17d, no dimples are required for spacing purposes. In the linear array which was tested, ten tubes 15 were employed, each with an outer diameter of one inch, and with a space of 0.5 inch between adjacent tubes. In all other respects the air ionizer unit 14g shown in FIG. 10 is identical to that shown in FIGS. 2 to 4, with ozone and other oxidizing agents being generated in the spaces between the tubes 15 and the outer electrodes 17.

I claim:

1. An air ionizer, comprising:
   a glass tube having a major portion with a generally cylindrical electrically nonconductive wall with inner and outer wall surfaces, and an extension substantially coaxial with said major portion;
   an inner electrode disposed entirely within the extension of said tube;
   an ionizable gas comprising an inert gas or mercury vapor disposed within said tube in communication with said inner electrode and the inner wall of the major portion of the tube;
   a foraminous outer copper electrode spaced from and substantially surrounding the outer surface of only the major portion of said tube; and
   means for applying a high voltage between said inner and outer electrodes to ionize said gas and to generate ozone in air or oxygen-containing gas introduced into the space adjacent said outer surface of said tube.

2. The air ionizer according to claim 1, wherein said inner electrode is hollow.

3. The air ionizer according to claim 1, wherein said inner electrode comprises a metal selected from the group consisting of copper, gold, nickel or tungsten.

4. The air ionizer according to claim 1, wherein said outer electrode has dimples for spacing the same from said outer surface of said tube.

5. The air ionizer according to claim 1, wherein said high voltage is an AC voltage.

6. The air ionizer according to claim 1, wherein the thickness of the wall of said tube adjacent said outer surface thereof decreases with increasing distance from said inner electrode.

7. The air ionizer according to claim 1, further including baffle means for directing air flow in a cylindrical path adjacent and coaxial with said outer electrode.

8. The air ionizer according to claim 1, further comprising a second inner electrode disposed at the other end of said tube in communication with the ionizable gas therein.

9. The air ionizer according to claim 1, wherein the distance between said outer electrode and the outer surface of said tube is in the range of 0.003 to 0.030 inches.

10. The air ionizer according to claim 1, wherein said high voltage is in the range of 500 to 15,000 volts.

11. The air ionizer according to claim 1, wherein said air ionizer is adapted to be connected in the intake air path of an internal combustion engine, the gross surface area of said outer electrode being at least 0.126 square inches for each horsepower generated by said engine.

12. The air ionizer according to claim 1, wherein said tube has a helical shape.

13. The air ionizer according to claim 1, wherein said tube extends radially from a hollow central member, further comprising a plurality of additional similar tubes extending radially from said central member, the space within each of said tubes communicating with the space within said central member.

14. The air ionizer according to claim 1, wherein said air ionizer is adpated to be connected in the intake air path of an internal combustion engine, the gross surface area of said outer electrode being at least 0.126 square inches for each horsepower generated by said engine.

15. An air ionizer, comprising:
a tube;
an inner electrode extending into said tube;
an ionizable gas disposed within said tube in communication with said inner electrode;
a foraminous outer electrode spaced from and substantially surrounding the outer surface of said tube, the distance between said outer electrode and the outer surface of said tube decreasing with increasing distance from said inner electrode; and
means for applying a high voltage between said inner and outer electrodes to ionize said gas and to generate ozone in air or oxygen-containing gas introduced into the space adjacent said outer surface of said tube.

16. An air ionizer, comprising:
a tube;
an inner electrode extending into said tube from one end thereof;
an ionizable gas disposed within said tube in communication with said inner electrode;
a second inner electrode disposed at the other end of said tube in communication with the ionizable gas therein;
a foraminous outer electrode spaced from and substantially surrounding the outer surface of said tube, the distance between said outer electrode and the outer surface of said tube being greatest near each of said inner electrodes and decreasing toward the region equidistant from said electrodes; and
means for applying a high voltage between said inner and outer electrodes to ionize said gas and to generate ozone in air or oxygen-containing gas introduced into the space adjacent said outer surface of said tube.

17. An air ionizer, comprising:
a glass tube;
an inner electrode disposed at an end of said tube;
an ionizable gas comprising an inert gas or mercury vapor disposed within said tube in communication with said inner electrode;
a foraminous outer electrode comprising copper spaced from and surrounding the outer surface of said tube, the distance between said outer electrode and the outer surface of said tube decreasing with increasing distance from said inner electrode; and
means for applying a high voltage between said electrodes to ionize said gas and to generate ozone in air or oxygen-containing gas introduced into the space adjacent said outer surface of said tube.

18. An air ionizer, comprising:
a glass tube;
an inner electrode disposed at an end of said tube;
an ionizable gas comprising an inert gas or mercury vapor disposed within said tube in communication with said inner electrode;
a foraminous outer electrode comprising copper spaced from and surrounding the outer surface of said tube, the distance between said outer electrode and the outer surface of said tube being greatest near each of said inner electrodes and decreasing toward the region equidistant from said electrodes; and
means for applying a high voltage between said electrodes to ionize said gas and to generate ozone in air or oxygen-containing gas introduced into the space adjacent said outer surface of said tube.

* * * * *